June 27, 1967
C. B. PALMER
3,328,087
CONTINUOUS CUTTING AND GATHERING MECHANISM
FOR A CONTINUOUS MINING MACHINE
Filed Aug. 3, 1966
3 Sheets-Sheet 1
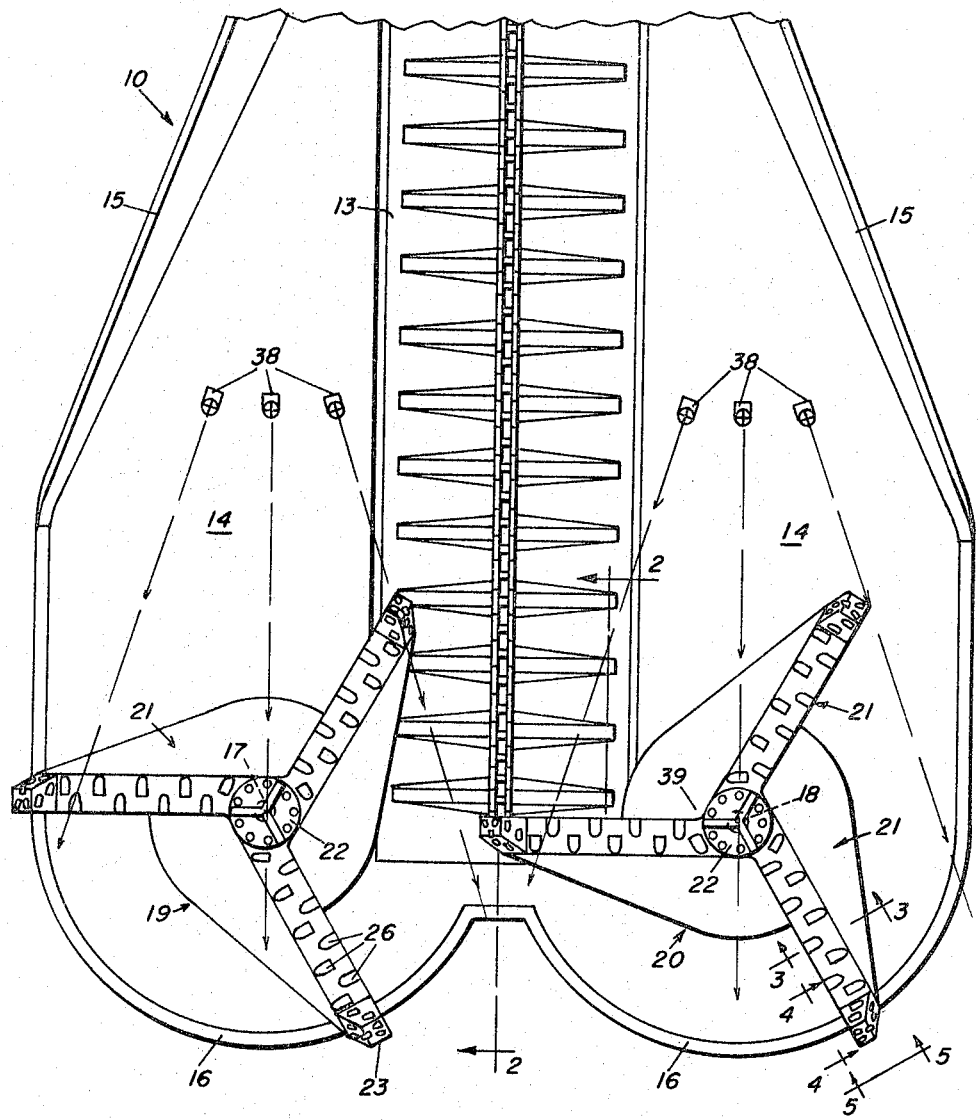
FIG. 1
FIG. 2
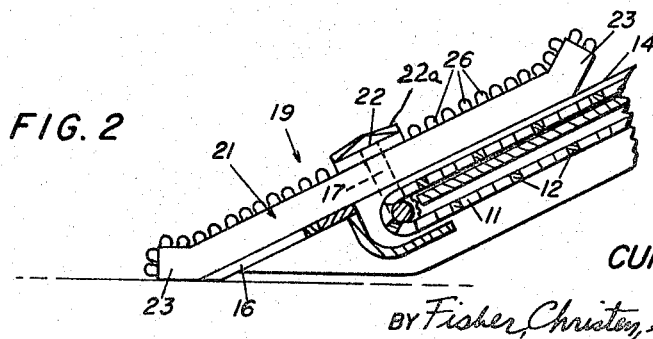
INVENTOR
CURTISS B. PALMER
BY Fisher, Christen, Sabol & Caldwell
ATTORNEYS June 27, 1967

C. B. PALMER 3,328,087

CONTINUOUS CUTTING AND GATHERING MECHANISM
FOR A CONTINUOUS MINING MACHINE

Filed Aug. 3, 1966

INVENTOR
*CURTISS B. PALMER*

BY *Fisher, Christen, Sabol & Caldwell*

ATTORNEYS

United States Patent Office 3,328,087
Patented June 27, 1967

3,328,087
CONTINUOUS CUTTING AND GATHERING MECHANISM FOR A CONTINUOUS MINING MACHINE
Curtiss B. Palmer, P.O. Box 275, Dante, Va. 24237
Filed Aug. 3, 1966, Ser. No. 569,918
14 Claims. (Cl. 299—67)

ABSTRACT OF THE DISCLOSURE

A pair of triple-armed feed wheels rotate about parallel axes disposed on opposite sides of an endless conveyor to direct particulate material to the conveyor. The extremities of the arms of the feed wheels overlap, and their trailing surfaces are inclined so that material will ride up over the arms rather than become engaged between them to cause jamming.

---

This is a continuation-in-part of my co-pending application, Ser. No. 361,764, filed Apr. 22, 1964, entitled "Continuous Gathering and Feeder for a Loading Machine" and now abandoned.

This invention relates to industrial equipment and more particularly to a continuous cutting and gathering mechanism for a continuous mining machine for conveying and loading heavy granular material such as crushed stone, coal, gravel or the like and for cutting and conveying certain materials of this type, such as coal, which when found in a mine is capable of being crushed and pulverized by mechanical cutters.

One object of the invention is to provide a pair of rotating wheel feeding mechanisms positioned on either side of the incoming end of an endless conveyor mechanism, which feeding mechanism cannot become jammed when handling large sized fragments of material.

Another object of the invention is to provide a combination loading and conveying device and cutter having improved production capacity over previously available apparatus of this type.

Further objects and advantages of the invention will be apparent to those skilled in the art after reading the following specification in connection with the annexed drawings, in which:

FIGURE 1 is a view from above the mechanism taken at right angles to the plane of the conveying mechanism;

FIGURE 2 is a cross-sectional elevation taken on the line 2—2 of FIGURE 1;

Figure 3:
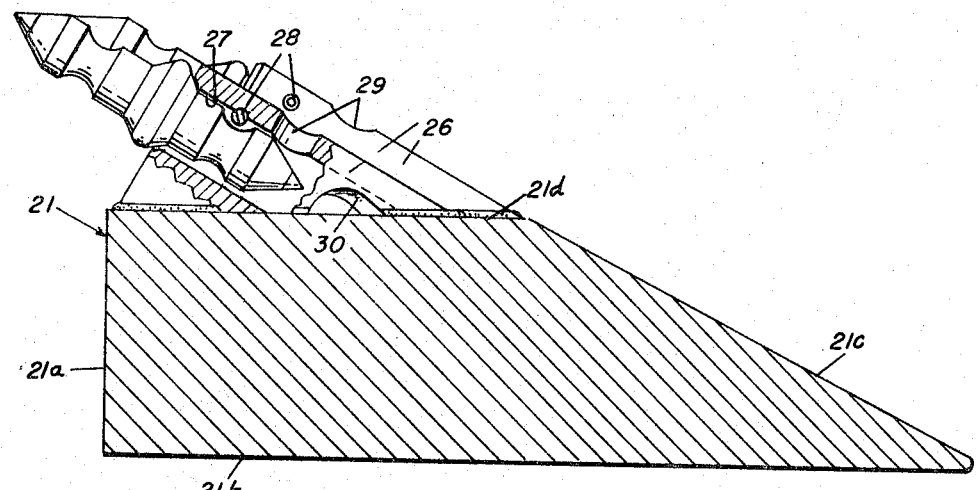
FIGURE 3 is a cross section on an enlarged scale taken on the line 3—3 of FIGURE 1.

In the drawings, numeral 10 indicates generally a conveying mechanism having an endless chain 11 provided with a series of longitudinally spaced transversely extending feeder bars 12. The upwardly moving portion of the chain 11 together with the feeder bars rides in a depressed well portion 13 disposed in the center of a flat surface 14 which extends outwardly on both sides of the conveyor at its inlet end and is provided with conveying upstanding side walls 15 beginning at a slight distance from the leading end of the surface 14. This leading end is formed with two semi-circular peripheral edges, indicated by numeral 16 which each extends for about 180 degrees terminating at their inner ends approximately tangent with the inlet ends of the conveyor 10 and at their outer ends merging into the lowermost portion of the side wall 15.

A pair of shafts 17 and 18 are mounted in suitable bearings, each located at the center of revolution of a respective semi-circular inlet edge 16 so as to be rotatable about an axis normal to the plane of these surfaces. Each of these shafts supports a feed wheel indicated generally by numerals 19 and 20 respectively. Conventional drive means including suitable gearing (not shown) is provided for driving the shafts 17 and 18 and their respective wheels 19 and 20 in opposite directions but at synchronous speeds, the wheel 19 rotating in a counter-clockwise direction and wheel 20 rotating in a clockwise direction. Since these feed wheel mechanisms are mirror images of each other, it will only be necessary to describe one of them in detail.

Each of the feed wheel means includes three radially extending arms 21 joined at their inner ends by a hub portion 22. The upper surface of the hub is raised slightly above the level of the upper surface of the arms and is generally conical in configuration. In addition, there are provided three radially extending ribs 22a, the leading face of which comprise cutting edges positioned generally in alignment with the leading edges of the arms 21. The arms and the hub portion are arranged to rotate in a plane parallel with the inlet surfaces 16 and with only sufficient clearance between them to maintain free running action. In addition, the drive mechanism for the shafts 17 and 18 is arranged to maintain the arms of one of the feed wheels in staggered relationship with respect to the arms of the other feed wheel as clearly seen in FIGURE 1, the length of the arm being such that they overlap slightly into the path of travel of the arms on the opposite feed wheel.

Preferably the angle of incline of the conveyor means is approximately 30 degrees as can be seen in FIGURE 2 and each of the arms is provided at its extremity with a tip portion 23 which projects radially beyond the peripheral edge 16 of the inlet surfaces. In a preferred form of construction, the tip portion 23 extends upwardly at an angle with respect to the main body of the arm while the bottom of the tip portion comprises a flat surface 24 disposed at an angle parallel with the surface of the ground.

In transverse cross-section each of the arms 21 is provided with a flat leading surface 21a disposed in a plane perpendicular to the direction of travel of the arm, a flat bottom surface 21b which extends in a plane parallel with the direction of travel, a forwardly and upwardly inclined rear surface 21c which merges at its upper end with a flat top surface 21b, parallel with the bottom 21b. To provide for the use of the feed wheels as cutters, the top surface 21d is provided with a series of carbide tips of conventional construction supported in a number of forwardly and upwardly inclined holders 26. Carbide tips of this type are well known in the art and may be either single or double ended so as to permit their removal from the holder when one of the tips are worn, reversed and replaced so as to position the other tip in use. Each of the holders is provided with a socket 27 to removably receive a tip, the tip being maintained in place by means of a removable pin or the like 28. The sockets are hollow and are provided with an opening 29 rearwardly of the inner end of the carbide tip to permit the introduction of a spray of cooling water as will be described later, and another opening 30 at the bottom of the holder is provided to allow this water to drain out. The number of holders on each arm may vary but in the form shown there are approximately nine and they are arranged on each arm in staggered relationship as viewed from above. In addition, the position of the holders with respect to their distances from the center of rotation should be varied as between the holders on one arm and the succeeding arms in order to insure that the carbide tips of one arm do not follow exactly in the path of the tips of the preceding arm.

Figure 4:
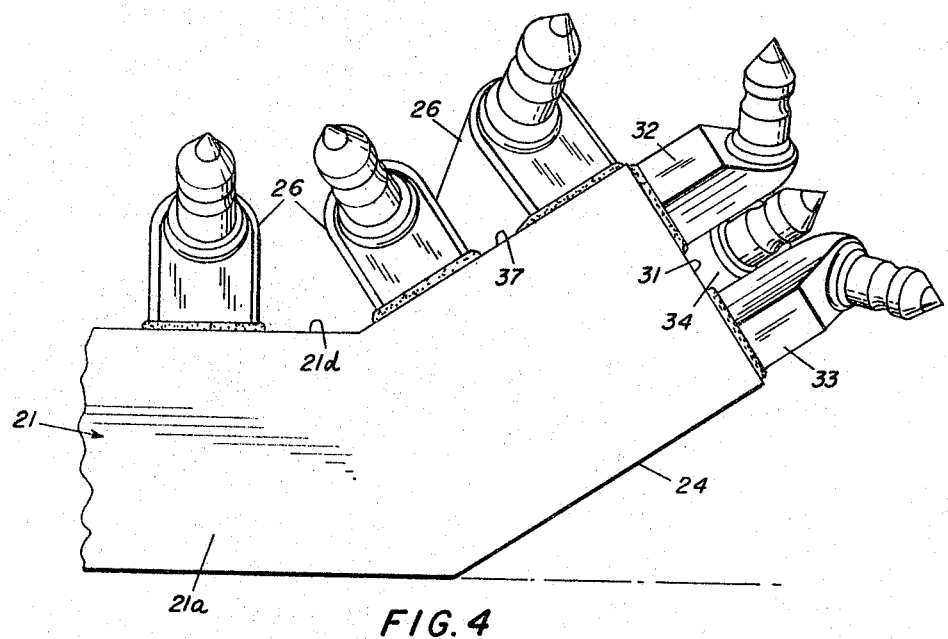
FIGURE 4 is a fragmentary view on the same scale as FIGURE 3 of the extremity of one of the arms looking at the leading edge.
Figure 5:
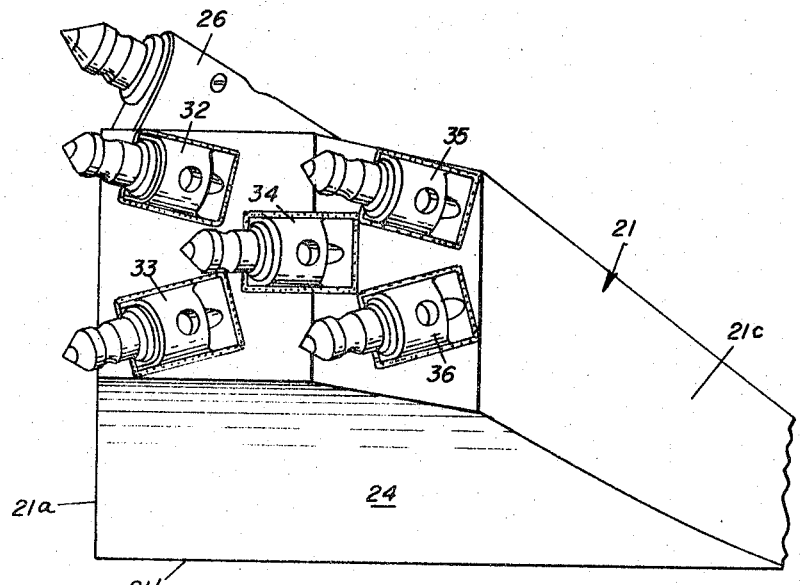
FIGURE 5 is an end view of the arm shown in FIGURE 4.

As shown in FIGURE 4, the outer extremity of the tips 23 are each provided with a flat surface 31 generally in a plane normal to the bottom surface 24 and parallel to the direction of travel of the wheel. This end surface may also be provided with a number of carbide tips removably held in holders 32, 33, 34, 35 and 36. As in the case of the holders 26, they should be arranged to dispose the axis of the tips at an angle of approximately 30 degrees with respect to the surface to which the holders are attached. In addition, instead of facing directly in the direction of travel of the wheel, holders 32 and 35 are angled upwardly to place the carbide tips substantially in the plane of the upper surface 37 of the tip while the holders 33 and 36 are inclined downwardly to place their respective tips in substantial alignment with the bottom surface 24. However, the centrally located holder 34 may be disposed to position the carbide tip with its axis generally in alignment with the path of travel of the wheel. It will be noted that, as shown in FIGURE 4, that the bit holders 26 on top of the arm continue out onto the flat surface above the tip of the arm. As previously noted these holders are cooled by a series of jets 38 supplied from a source of water under pressure (not shown) these jets being positioned above the feed wheels on opposite sides of the conveyor 10. It should also be noted that surface of the hub 39 is formed generally in the shape of frustum of a cone having an incline approximately equal to that of the rear surface 21c of each of the arms.

Figure 6:
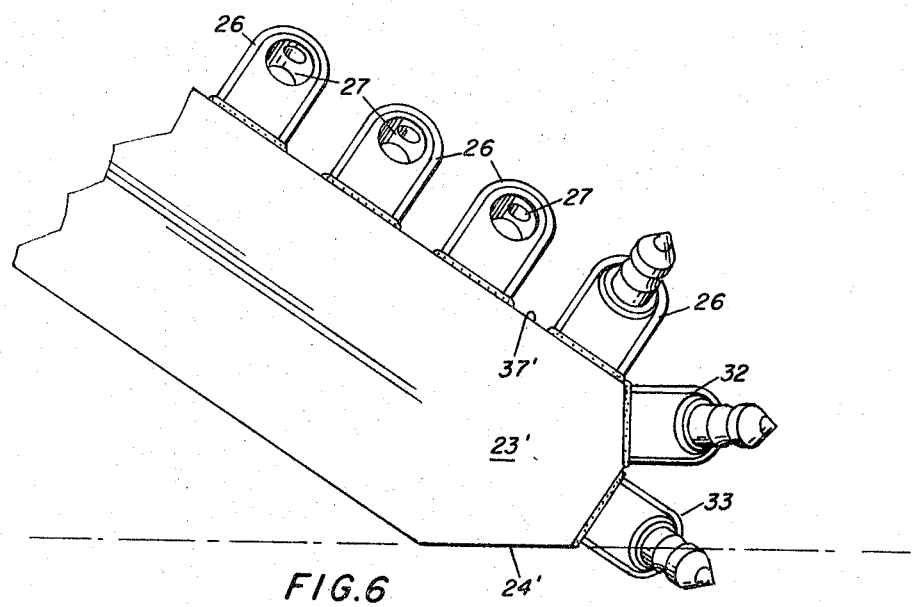
FIGURE 6 is a fragmentary view, similar to that of FIGURE 4 but showing a modified form of arm.

In a modified form of arm, shown in FIGURE 6, the tip portion 23′, while provided with an upwardly inclined lower flat surface 24′, has its upper surface 37′ extending outwardly as a continuation of the upper surface 21d of the main portion of the arm. In this modified form of arm the end surface 31′ of the tip is necessarily smaller and may therefore accommodate fewer carbide tip holders. For example, in the modification shown only two holders 32′ and 33′ may be accommodated.

In operation it will be understood that the entire mechanism may be mounted upon a separate supporting vehicle which may itself be self propelled. If the mechanism is being used as a cutter loader it may be moved into a pile of material to be moved, such as rocks, coal, gravel or the like, and as the flat leading surfaces 21a of the feed wheels contact the material, it will be thrown in a direction parallel to the movement of the conveyor and towards the center of the loading surface 14 towards the conveyor itself.

Further, the significance of the inclined sloping trailing surface 21c of each of the arms of the feeder wheels and the inclined surface of the hub is that no jamming of the feed wheels can occur since, if the leading face of the wheel on the right hand side were to encounter a rock or piece of material large enough to span the distance between it and the arm on the left hand wheel just preceding it, the inclined surface of the left hand wheel would cause the rock or material to pass on over it rather than to cause the two wheels to become locked, which would be the case if the trailing surface of the arms were also perpendicular to the direction of travel of the arms. When the mechanism is being used as a cutter and loader the same considerations will also take effect.

Having disclosed several forms in which the invention may be practiced, it will be obvious to those skilled in the art that modifications and improvements may be made which would come within the scope of the annexed claims.

I claim:

1. In a continuous cutting and loading mechanism for a continuous mining machine or the like, comprising an endless conveyor means, said conveyor means including a flat surface at the leading end, chain conveyor means for moving material away from the leading edge, a pair of feed wheels disposed on opposite sides of the conveyor means and adjacent the leading end thereof, and means for rotating the wheels synchronously in opposite directions about spaced parallel axes, each of said wheels including a hub and three radially extending equi-angularly spaced arms immovably fixed to the hub, each arm having a flat leading face normal to the plane of the conveyor means surface and a trailing surface inclined downwardly and rearwardly to permit material to pass thereover, the bottom of each arm being closely spaced from said conveyor means surface at all times, the arms of one feed wheel being 60 degrees out of phase with respect to the arms of the other feed wheel.

2. The invention as defined in claim 1, wherein each feed wheel is provided with a central hub of frusto-conical shape, the inclined surface merging with the trailing surfaces of the arms, the upper surfaces of the arms being flat and coextensive with the upper surface of the hub.

3. The invention as defined in claim 1, wherein the upper surface of the arms are flat and a plurality of cutting tip holders are mounted thereon, said holders having an upwardly forwardly directed socket for a tip.

4. The invention as defined in claim 3, wherein said holders are hollow, and include an opening provided at the rear to receive cooling liquid and an opening provided adjacent the bottom to discharge liquid.

5. The invention as defined in claim 4, wherein nozzle means are provided on the conveyor means for directing liquid on the rear portions of said holders.

6. The invention as defined in claim 5, wherein nozzle means are provided for each feed wheel positioned on the conveyor means spaced from each wheel in a direction away from the leading edge.

7. The invention as defined in claim 3, wherein said holders on each arm are arranged in staggered relationship with respect to each other.

8. The invention as defined in claim 3, wherein the holders of one arm are arranged in radially staggered relationship to the holders of a succeeding arm.

9. The invention as defined in claim 1, wherein the leading edge of the conveyor means surface is defined by two circular arcs having their centers of revolution coaxial with the axes of the respective feed wheels.

10. The invention as defined in claim 9, wherein the extremity of each arm extends beyond the leading edge of the conveyor means surface, said surface is positioned at an angle with respect to the horizontal, and the bottom surface of said extremity extends at an equal angle with respect to the remainder of the arm.

11. The invention as defined in claim 10, wherein the upper surface of the extremity is flat and parallel to the bottom surface of the extremity.

12. The invention as defined in claim 10, wherein the upper surface of the extremity is an extension of the upper surface of the remainder of the arm.

13. The invention as defined in claim 1, wherein each of said feed wheels is provided with a central hub portion having an exposed upper surface of generally conical configuration, said surface also being provided with a plurality of radially extending ribs, the leading surfaces of the ribs comprising cutting edges.

14. The invention as defined in claim 13, wherein said cutting edges are generally disposed in alignment with the leading edges of the arms of the feed wheels.

References Cited

UNITED STATES PATENTS

| | | | |
|---|---|---|---|
| 1,796,943 | 3/1931 | Pratt | 198—9 |
| 2,693,950 | 11/1954 | Calder | 299—81 X |
| 2,696,288 | 12/1954 | Ball | 198—9 |
| 2,801,091 | 7/1957 | Joy | 299—56 |
| 2,833,521 | 5/1958 | Olsen | 175—335 |

ERNEST R. PURSER, *Primary Examiner.*